US012681284B2

(12) United States Patent
Akturk et al.

(10) Patent No.: US 12,681,284 B2
(45) Date of Patent: Jul. 14, 2026

(54) METHOD AND APPARATUS FOR RAPID DEPTH-SCANNING IN LASER IMAGING

(71) Applicant: Fluorescence Microscopy Business Unit (FMBU) of Bruker Nano Surfaces Division, Madison, WI (US)

(72) Inventors: Selcuk Akturk, Madison, WI (US); Jimmy Fong, Madison, WI (US); Bill Vogt, Madison, WI (US)

(73) Assignee: Fluorescence Microscopy Business Unit (FMBU) of Bruker Nano Surfaces Division, Madison, WI (US)

( * ) Notice: Subject to any disclaimer, the term of this patent is extended or adjusted under 35 U.S.C. 154(b) by 239 days.

(21) Appl. No.: 18/700,334

(22) PCT Filed: Oct. 12, 2022

(86) PCT No.: PCT/US2022/046426
§ 371 (c)(1),
(2) Date: Apr. 11, 2024

(87) PCT Pub. No.: WO2023/064374
PCT Pub. Date: Apr. 20, 2023

(65) Prior Publication Data
US 2025/0052986 A1 Feb. 13, 2025

Related U.S. Application Data

(60) Provisional application No. 63/255,201, filed on Oct. 13, 2021.

(51) Int. Cl.
*G02B 21/00* (2006.01)
*G02B 5/00* (2006.01)
(Continued)

(52) U.S. Cl.
CPC ......... *G02B 21/0032* (2013.01); *G02B 5/001* (2013.01); *G02B 21/0048* (2013.01);
(Continued)

(58) Field of Classification Search
CPC G02B 21/0032; G02B 5/001; G02B 21/0048; G02B 27/0025; G02B 27/0955;
(Continued)

(56) References Cited

U.S. PATENT DOCUMENTS 3,013,467 A 12/1961 Minsky
9,201,008 B2 12/2015 Thériault
(Continued)

FOREIGN PATENT DOCUMENTS

CN 109799602 A 5/2019

OTHER PUBLICATIONS

Akturk S. et al., "The general theory of first-order spatio-temporal distortions of Gaussian pulses and beams," Opt Express, vol. 13, No. 21, pp. 8642-8661, 2005.
(Continued)

*Primary Examiner* — Mariam Qureshi
(74) *Attorney, Agent, or Firm* — Joseph T. Leone; Yanjun Ma; DeWitt LLP

(57) ABSTRACT

Disclosed herein is a method and apparatus for rapid depth-scanning in laser imaging. The method comprises masking selected regions of a laser beam incident on a Bessel-beam-forming optical system to generate line foci with controllable depths and lengths. The use of a digital micromirror device (DMD) as the masking device enables rapid (multi kHz rate) modification of the input mask, and thereby rapidly varying the length and axial location of a subsection of typical Bessel beam region in a sample.

22 Claims, 11 Drawing Sheets

(51) Int. Cl.
 *G02B 27/00*     (2006.01)
 *G02B 27/09*     (2006.01)
 *G02B 26/10*     (2006.01)

(52) U.S. Cl.
 CPC ..... *G02B 27/0025* (2013.01); *G02B 27/0955* (2013.01); *G02B 26/105* (2013.01)

(58) Field of Classification Search
 CPC ............... G02B 26/105; G02B 21/367; G02B 2207/114; G02B 21/0076; G02B 21/16; G01N 21/6458
 See application file for complete search history.

(56)      References Cited

U.S. PATENT DOCUMENTS

| | | | |
|---|---|---|---|
| 9,348,136 | B2 | 5/2016 | McDonald et al. |
| 9,835,840 | B2 | 12/2017 | Jalali et al. |
| 10,809,510 | B2 | 10/2020 | Ji |
| 2006/0017920 | A1 | 1/2006 | Tsuchiya |
| 2007/0229946 | A1 | 10/2007 | Okada |
| 2009/0034392 | A1* | 2/2009 | Hotta .................... G11B 7/0909 |
| 2013/0010283 | A1 | 1/2013 | Villiger et al. |
| 2013/0126756 | A1* | 5/2013 | Xu .......................... G02B 21/16 |
| | | | 250/459.1 |
| 2016/0230167 | A1* | 8/2016 | Koenig ................... C12M 41/36 |
| 2019/0310451 | A1* | 10/2019 | Tomer ................ G02B 21/0032 |
| 2020/0232768 | A1* | 7/2020 | Poplawski ....... G08B 13/19602 |
| 2021/0080709 | A1* | 3/2021 | Ronzitti ................... G02B 5/32 |
| 2022/0057561 | A1* | 2/2022 | Leslie .................. G02B 6/0058 |
| 2022/0314366 | A1* | 10/2022 | Calefati ............... B23K 26/147 |

OTHER PUBLICATIONS

Arlt J. and Dholakia K., "Generation of high-order Bessel beams by use of an axicon," Opt Commun, vol. 177, No. 1-6, pp. 297-301, 2000.
Bowman R. et al., "Efficient generation of Bessel beam arrays by means of an SLM," Eur. Phys. J. Spec. Top., vol. 199, No. 1, pp. 159-166, Nov. 2011.
Botcherby, E. J., et al., "Scanning two-photon fluorescence microscopy with extended depth of field," Optics Communications, Elsevier, Amsterdam, Netherlands, vol. 268, No. 2, Aug. 1, 2006, pp. 253-260. DOI: 10.1016/j.optcom.2006.07.026.
Breen, Taylor, et al., "Tuning the resolution and depth of field of a lens using an adjustable ring-beam illumination," Applied Optics, vol. 59, No. 15, May 20, 2020, p. 4744. ISSN 1559-128X. DOI: 10.1364/AO.389353.
Chang, Chia-Yuan, et al., "Improved and fast biotissue imaging by temporal focusing widefield multiphoton microscopy with spatially modulated illumination," Progress in Biomedical Optics and Imaging, SPIE—International Society for Optical Engineering, Bellingham, WA, USA, vol. 11076, Jul. 31, 2019, Article 110760G. ISSN 1605-7422. ISBN 978-1-5106-0027-0. DOI: 10.1117/12.2526908.
Cheng J. et al., "High-speed femtosecond laser beam shaping based on binary holography using a digital micromirror device," Opt. Lett., vol. 40, No. 21, pp. 4875-4878, Nov. 2015.
Denk, W. et al., "Two-photon laser scanning fluorescence microscopy," Science, vol. 248, No. 4951, pp. 73-76, Apr. 1990.
Ducros M. et al., "Encoded multisite two-photon microscopy," Proc. Natl. Acad. Sci., vol. 110, No. 32, pp. 13138-13143, Aug. 2013.
Durnin J. et al., "Diffraction-free beams," Phys Rev Lett, vol. 58, No. 15, pp. 1499-1501, 1987.
Durnin J., "Exact solutions for nondiffracting beams. I. the scalar theory," J Opt Soc Am A, vol. 4, No. 4, pp. 651-654, 1987.
European Search Report, dated Nov. 6, 2025, Application No. 2288171.9.
Fan J. L. et al., "High-speed volumetric two-photon fluorescence imaging of neurovascular dynamics," Nat. Commun., vol. 11, No. 1, Art. No. 1, Nov. 2020.
Geng Q. et al., "Digital micromirror device-based two-photon microscopy for three-dimensional and random-access imaging," Optica, vol. 4, No. 6, pp. 674-677, Jun. 2017.
Grewe, B. F. et al., "Fast two-layer two-photon imaging of neuronal cell populations using an electrically tunable lens," Biomed. Opt. Express, vol. 2, No. 7, pp. 2035-2046, Jul. 2011.
International Search Report and Written Opinion, dated Jan. 20, 2023, PCT Application No. PCT/US22/46426.
Kirkby P. A. et al., "A compact acousto-optic lens for 2D and 3D femtosecond based 2-photon microscopy," Opt. Express, vol. 18, No. 13, pp. 13720-13744, Jun. 2010.
Lu R. et al., "Video-rate volumetric functional imaging of the brain at synaptic resolution," Nat. Neurosci., vol. 20, No. 4, Art. No. 4, Apr. 2017.
McLeod J. H. , "The Axicon: A new type of optical element," J Opt Soc Am, vol. 44, No. 8, pp. 592-597, 1954.
Niggl L. et al., "Properties of Bessel beams generated by periodic gratings of circular symmetry," J Opt Soc Am A, vol. 14, No. 1, pp. 27-33, 1997.
Park J. K. et al., "Enhanced Axial Resolution of Wide-Field Two-Photon Excitation Microscopy by Line Scanning Using a Digital Micromirror Device," Micromachines, vol. 8, No. 3, Art. No. 3, Mar. 2017.
Siegman A. E., Lasers. Univ Science Books, 1986. (Book—No Copy Provided).
Sofroniew N. J. et al., "A large field of view two-photon mesoscope with subcellular resolution for in vivo imaging," eLife, vol. 5, p. e14472, Jun. 2016.
Thériault G. et al., "Extended depth of field microscopy for rapid volumetric two-photon imaging," Opt. Express, vol. 21, No. 8, pp. 10095-10104, Apr. 2013.

\* cited by examiner m = 1 m = 1. zeroth m = 2 m = 2. zeroth m = 3 m = 3. zeroth

METHOD AND APPARATUS FOR RAPID DEPTH-SCANNING IN LASER IMAGING

CROSS-REFERENCE TO RELATED APPLICATIONS

Priority is hereby claimed to U.S. provisional application Ser. No. 63/255,201, filed 13 Oct. 2021, which is incorporated herein by reference.

BACKGROUND

Fluorescence microscopy is one of the workhorse methods for biological and medical research. A wide variety of methods has been developed to apply this method to myriad of samples and configurations. One of the major obstacles in fluorescence microscopy is optical scattering. Biological tissues strongly scatter light, limiting the depth at which microscopical images can be acquired. As a result, conventional optical microscopes typically require thin slices of samples for proper imaging. The earliest invention to address this problem is confocal microscopy (U.S. Pat. No. 3,013,467), which works around scattering by using an optical configuration where only in-focus light from the plane of interest passes through a pinhole and is collected at a detector, and out-of-focus fluorescence is blocked. Confocal microscopy has been used extensively since its invention. A more recent alternative for imaging from inside tissues is nonlinear microscopy (W. Denk et al., "Two-photon laser scanning fluorescence microscopy," Science, vol. 248, no. 4951, pp. 73-76, April 1990), where short-pulsed, longer-wavelength lasers generate fluorescence signals only within the most intense region of the focal volume. Both methods can generate images of planes from within the tissues, by scanning in a point-by-point manner. As a result, the time needed to collect a complete image is highly dependent on the speed of several components in the apparatus.

In a typical point-scan microscope, lateral scanning (x-y plane in FIG. 1A) is done using galvanometer-controlled mirrors. Scanning speeds of resonant galvo mirrors can exceed 10 kHz, making it preferred way for rapid scanning. Axial scanning (z-axis in FIGS. 1A and 1B) typically requires a method of its own, and traditionally has been the bottleneck of three-dimensional scanning. The simplest way of axial scanning is mechanical translation of the microscope objective, typically with piezoelectric stages. Due to relatively large inertia of microscope objectives, such scanning speeds are rather slow. A multitude of optical methods have been developed to increase the speed of depth scanning. For example, electrically tunable lenses can induce convergence and/or divergence to the laser beam prior to the objective, and thereby extend/retract the position of the focus in the z-direction (B. F. Grewe et al., "Fast two-layer two-photon imaging of neuronal cell populations using an electrically tunable lens," Biomed. Opt. Express, vol. 2, no. 7, pp. 2035-246 July 2011). The response time of electrically tunable lenses is few milliseconds, and corresponding scan rates (complete image) are around 20-30 Hz. Another approach that allows accessing not only different depths, but any point in the three-dimensional accessible volume, is using acousto-optic lenses (P. A. Kirkby et al., "A compact acousto-optic lens for 2D and 3D femtosecond based 2-photon microscopy," Opt. Express, vol. 18, no. 13, pp. 13720-13744, June 2010). The speed of such random-access sequences can reach tens of kHz. The main drawback of this method is its significant cost and experimental complexity.

One can also generate a remote-focusing mechanism by using a complementary microscope objective prior to the imaging one; retroreflecting focused beam back on itself and rapidly scanning the reflector to control the focal plane of the imaging objective (N. J. Sofroniew et al., "A large field of view two-photon mesoscope with subcellular resolution for in vivo imaging," eLife, vol. 5, p. e14472, June 2016).

Three-dimensional imaging with point-scanning methods is inherently speed-limited, due to the requirement of accessing large numbers of points. Furthermore, while galvo mirrors can scan at kilohertz frequencies, inertial depth-scanning methods (e.g., tunable lenses and vibrating mirrors) are much slower. Rapid imaging is crucial in applications such as neuroscience, where cell communication takes place in milliseconds or shorter time scales.

A recent scanning approach to improve on speed is "volumetric imaging" (G. Thériault et al., "Extended depth of field microscopy for rapid volumetric two-photon imaging," Opt. Express, vol. 21, no. 8, pp. 10095-10104, April 2013; J. L. Fan et al., "High-speed volumetric two-photon fluorescence imaging of neurovascular dynamics," Nat. Commun., vol. 11, no. 1, Art. no. 1, November 2020; R. Lu et al., "Video-rate volumetric functional imaging of the brain at synaptic resolution," Nat. Neurosci., vol. 20, no. 4, Art. no. 4, April 2017), where laser beams are shaped into line foci along the optical axis, rather than points (FIG. 1B). These special beams are known as non-diffracting beams or Bessel beams (J. Durnin et al., "Diffraction-free beams," Phys Rev Lett, vol. 58, no. 15, pp. 1499-1501, 1987; J. Durnin, "Exact solutions for nondiffracting beams. I. the scalar theory," J Opt Soc Am A, vol. 4, no. 4, pp. 651-654, 1987). Bessel beams stay intense over distances much larger (10-100 times typical) than conventional focused Gaussian beams. Volumetric imaging with Bessel beams decreases acquisition time greatly since the entire sample depth is illuminated simultaneously. However, this gain in image collection speeds comes with a sacrifice in axial resolution. All features along the line focus in z-direction at a given lateral point (x, y) are integrated into a single data point, and hence depth information is lost. As a consequence, state of the art methods of volumetric imaging are limited to imaging of low-density samples, such that on average, there is roughly one cell along the given line. To address this critical problem, disclosed herein is a method and apparatus that allows recovery of the axial information in volumetric-type imaging.

SUMMARY

Disclosed herein is an apparatus for rapid depth-scanning in laser imaging or photostimulation. The method comprises:
  a laser source dimensioned and configured to generate an input laser beam;
  a masking device dimensioned and configured to mask desired patterns over the input laser beam to yield a masked laser beam;
  a beam-shaping element to convert the masked laser beam to a beam with controlled position and length of line focus; and
  a scanning microscope dimensioned and configured to transfer the beam resulted from the beam-shaping element to a focal plane of a microscope objective lens.
  The apparatus further comprises a laser beam power controller and a laser beam size controller operationally linked to the laser source.

The apparatus further comprises an astigmatism controller dimensioned, configured, and located to correct for beam ellipticity of the input laser beam.

The apparatus further comprises a diffractive element dimensioned and configured to correct for angular dispersion, which is placed before or after the masking device.

In certain versions, the masking device generates a mask with multiple simultaneous rings, such that each ring generates a different focal zone in a sample plane, allowing simultaneous imaging from a plurality of planes.

In certain versions, the masking device switches between two ring shapes, such that each ring generates a different focal zone in a sample plane, allowing interlaced imaging between the two planes.

Preferably, the masking device is a digital micromirror device ("DMD"). The DMD uses a blazed grating to maximize diffraction efficiency off the DMD.

The beam resulted from the beam-shaping element is a Bessel beam. In certain versions, the beam-shaping element is an axicon, a spatial light modulator, or a diffractive axicon.

The apparatus further comprises an optical relay system dimensioned and configured to project an image of the masked laser beam at an entrance facet of the beam-shaping element.

The scanning microscope of the apparatus further comprises:
  a transfer lens to replay the beam resulted from the beam-shaping element to an imaging zone;
  a resonant galvo scanner;
  an optical relay system to relay the resonant galvo plane onto a pair of galvo mirrors; and
  a point scanning system comprising a pair of galvo mirrors, a scan lens, a tube lens, and an objective lens.

The apparatus further comprises a detection system comprising at least one photomultiplier tube.

The apparatus further comprises a centralized control unit dimensioned and configured to control power of the laser source, project the desired patterns on the masking device, control galvo scanners, collect fluorescent signals from at least one detector, collect fluorescent signals from at least one point in a sample, and display collected data as two- or three-dimensional images.

Also disclosed herein is a method for rapid depth-scanning in laser imaging or photostimulation. The method comprises:
  (a) generating an input laser beam;
  (b) masking a desired pattern over the input laser beam to yield a masked laser beam;
  (c) converting the masked laser beam to a beam with controlled position and length of line focus;
  (d) transferring the beam of step (c) to a focal plane of a microscope objective lens; and
  (e) collecting fluorescence signal from a sample illuminated with the beam of step (d).

The method further comprises adjusting laser power and/or laser beam size of the input laser beam after step (a).

The method further comprises correcting for beam ellipticity before or after step (b).

The method further comprises correcting for angular dispersion before or after step (b).

The method further comprises projecting an image of the masked laser beam generated in step (b) for converting the masked laser beam in step (c).

The beam resulted from step (c) is a Bessel beam.

The objects and advantages of the disclosure will appear more fully from the following detailed description of the preferred embodiment of the disclosure made in conjunction with the accompanying drawings.

DETAILED DESCRIPTION

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

As used herein, the singular forms "a," "an," and "the" include plural referents unless the content clearly dictates otherwise.

As used herein, the term "or" is an inclusive "or" operator and is equivalent to the term "and/or" unless the context clearly dictates otherwise.

The elements and method steps described herein can be used in any combination whether explicitly described or not, unless otherwise specified or clearly implied to the contrary by the context in which the referenced combination is made.

All combinations of method steps as used herein can be performed in any order, unless otherwise specified or clearly implied to the contrary by the context in which the referenced combination is made.

The system disclosed herein my comprise, consist of, or consist essentially of the various steps and elements disclosed herein.

It is understood that the disclosure is not confined to the particular elements and method steps herein illustrated and described, but embraces such modified forms thereof as come within the scope of the claims.

Bessel Beams:

The fundamental optical concept behind volumetric imaging is generation of line-foci, which are achieved via so-called non-diffracting beams or Bessel beams. Laser cavities generally emit transverse intensity profiles described in terms of Gaussian beams (A. E. Siegman, Lasers. Univ Science Books, 1986). In the most commonly used case, also known as single-mode or TEM$_{00}$, the intensity cross section follows a bell-shape curve, while the width of the bell varies by propagation:

$$I(r, z) = \frac{P}{\pi w(z)^2} \exp\left(-2\frac{r^2}{w(z)^2}\right) \qquad \text{Eq. 1}$$

where I is optical intensity or irradiance, defined by energy per unit area per unit time, r is radial and z is axial position, w(z) is the beam radius, and P is the total power of the beam. It is important to note the dependence of the beam radius on z, the propagation distance. This dependence is given by:

$$w(z) = w_0 \sqrt{1 + (z/z_R)^2} \qquad \text{Eq. 2}$$

wherein $$z_R = \pi w_0^2 / \lambda \qquad \text{Eq. 3}$$

$\lambda$ being the wavelength of laser light. In Eqs. 2-3 above, w$_0$ is the minimum radius for a given Gaussian beam and often referred to as beam waist; and z$_R$ is the propagation distance over which intensity falls by one-half.

Figures 1A, 1B:
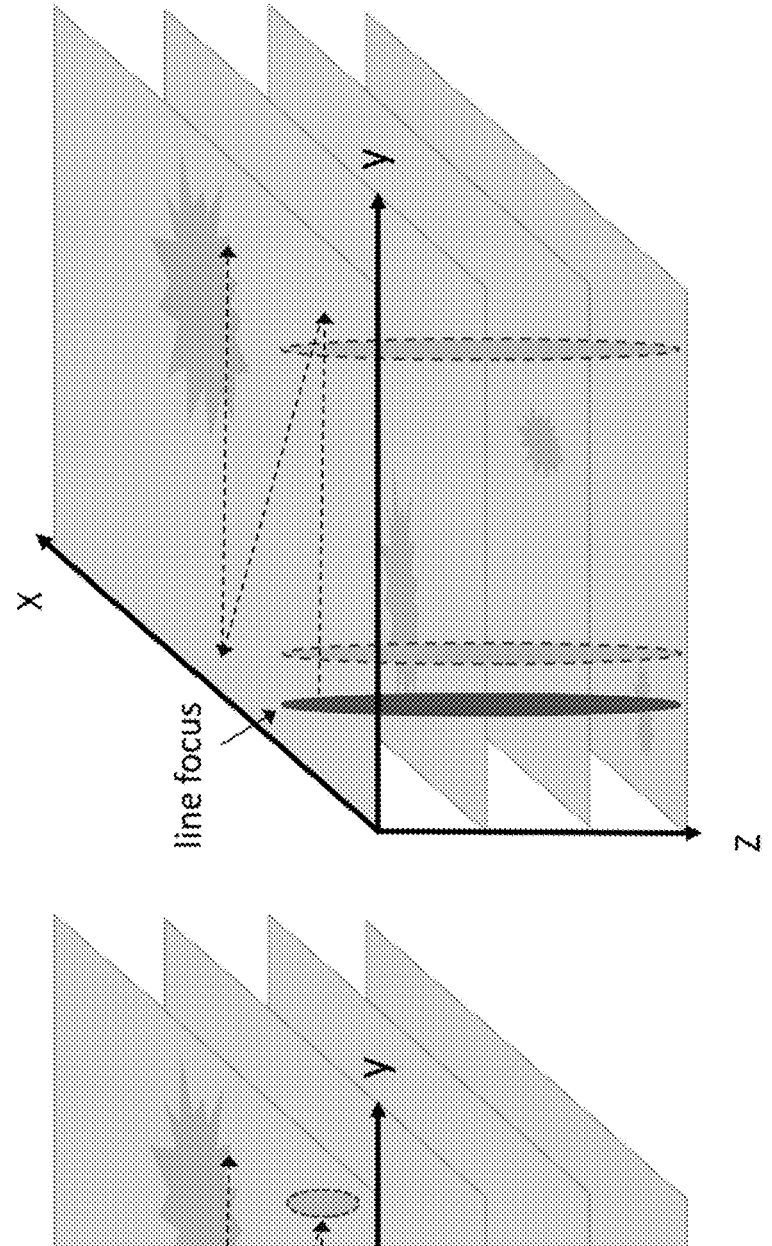
FIG. 1A is a schematic of three-dimensional imaging using the point-scan method.
FIG. 1B is a schematic of volumetric imaging using extended focus line scans.

The propagation behavior described above is a direct consequence of wave nature of light, or more particularly, diffraction. It is fundamentally dictated that the smallest radius of a focused beam is approximately half the wavelength. In the light of Eq. 3, the axial extent of such focused beam would be of the order of the wavelength, as well. This lower-bound is known as the diffraction limit. FIG. 1A denotes the ellipsoid-like three-dimensional shape of a focused Gaussian beam. This strong localization can be an advantage for point-scanning, as it increases axial and lateral resolution. However, it also hinders volumetric scanning, or other applications where longer focal regions would be preferable.

Figure 2:
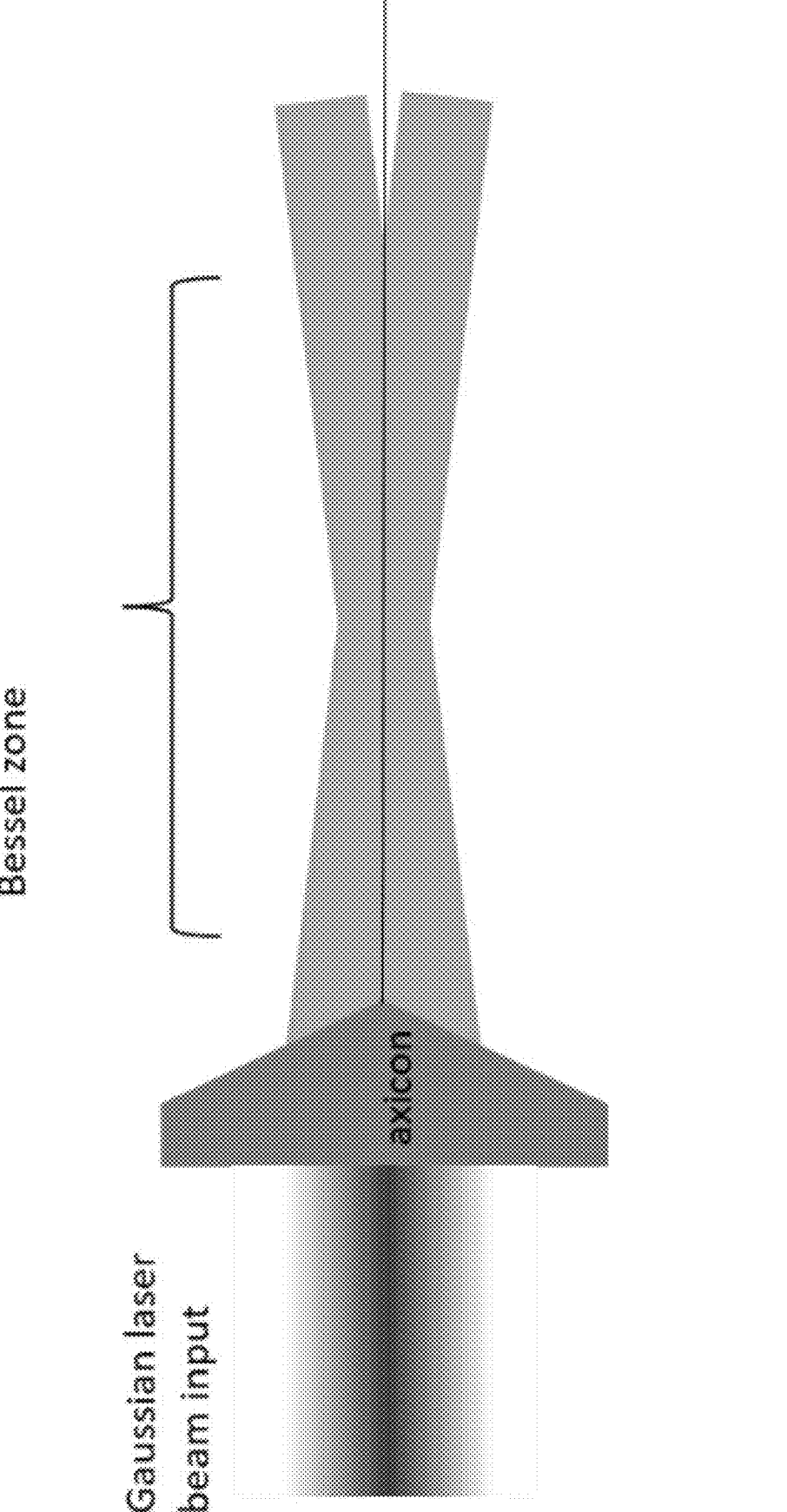
FIG. 2 shows conversion of a Gaussian beam to a Bessel beam by an axicon.

The mathematical basis of non-diffracting beams is first laid out by Durnin (J. Durnin et al., "Diffraction-free beams," *Phys Rev Lett*, vol. 58, no. 15, pp. 1499-1501, 1987), who shows that if the radial profile of light follows Bessel-function of the first kind, the beam radius and intensity becomes independent of the propagation distance. While this mathematical idealization for Bessel beams requires infinite energy, and hence not practical, approximations are possible. One of the easiest and most commonly used ways of converting a Gaussian beam to a Bessel beam is using a conical lens or an axicon (J. H. McLeod, "The Axicon: A new type of optical element," *J Opt Soc Am*, vol. 44, no. 8, pp. 592-597, 1954). As shown in FIG. 2, when a Gaussian beam passes through an axicon, it splits into a cone of angular spread, and over the region where the beam remains overlapped, the Bessel zone is formed.

The intensity profile of Bessel beams generated by an axicon is given by J. Arlt and K. Dholakia, "Generation of high-order Bessel beams by use of an axicon," *Opt Commun*, vol. 177, no. 1-6, pp. 297-301, 2000:

$$I(r, z) = \frac{4Pkr\sin\beta}{w_0} \frac{z}{z_{max}} J_0^2(kr\sin\beta) \exp\left(-2\frac{r^2}{z_{max}^2}\right) \qquad \text{Eq. 4}$$

6 where k is the wavenumber given by 2λ/λ, β is the half-cone angle of the beam after axicon, w$_0$ is the radius of the incoming Gaussian beam, z$_{max}$ is the axial position where maximum intensity occurs, and J$_0$ is the zeroth-order Bessel function of the first kind.

Other methods for generating Bessel beams include, but not limited to, using a narrow ring followed by a lens (J. Durnin et al., "Diffraction-free beams," *Phys Rev Lett*, vol. 58, no. 15, pp. 1499-1501, 1987), spatial light modulators (R. Bowman et al., "Efficient generation of Bessel beam arrays by means of an SLM," *Eur. Phys. J. Spec. Top.*, vol. 199, no. 1, pp. 159-166, November 2011), and circular periodic gratings (L. Niggl et al., "Properties of Bessel beams generated by periodic gratings of circular symmetry," *J Opt Soc Am A*, vol. 14, no. 1, pp. 27-33, 1997). Regardless of the method of generation, these beams share common propagation characteristics, as summarized below.

Figure 3:
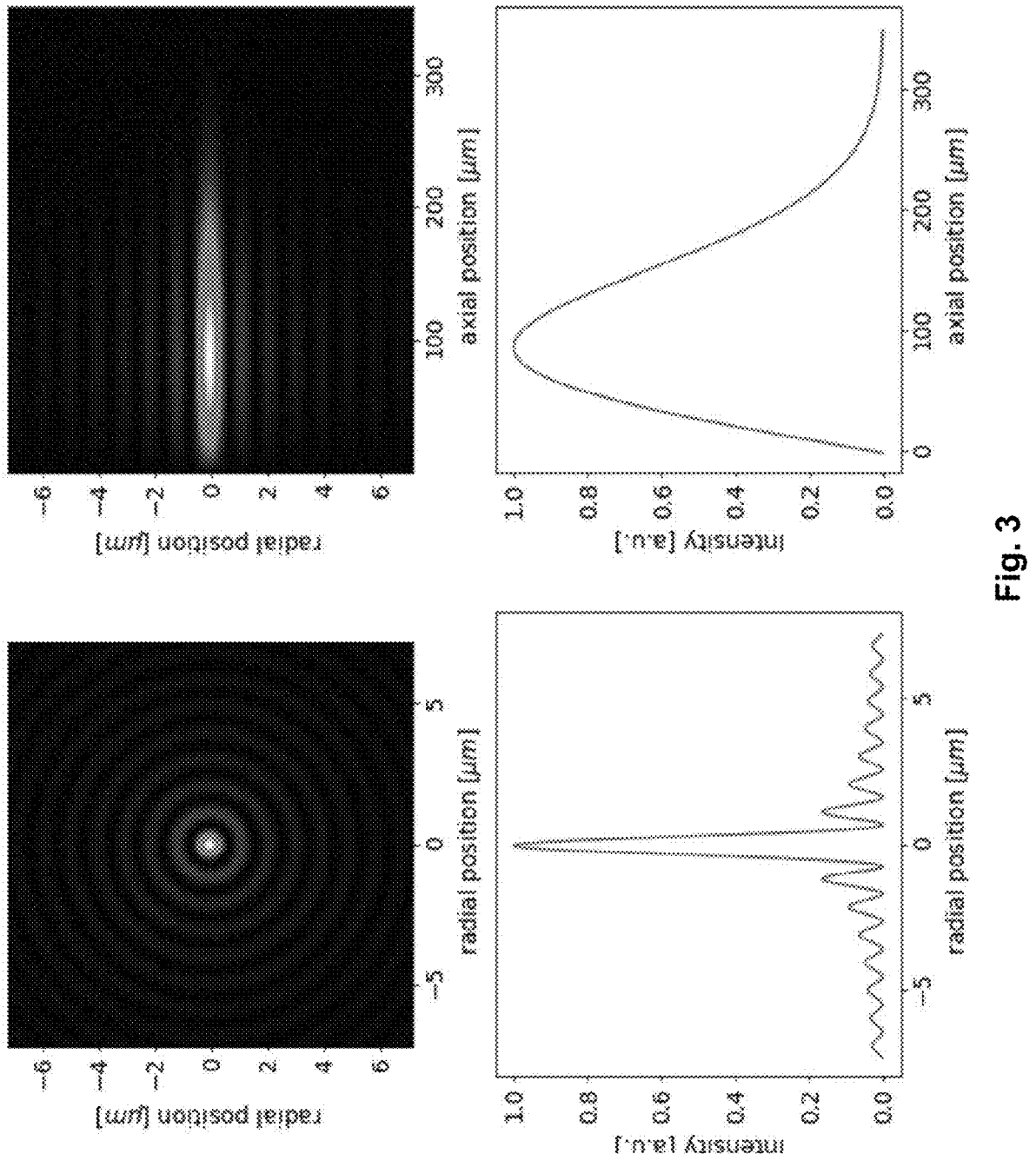
FIG. 3 shows the radial and axial intensity distribution of a Bessel beam, calculated according to Eq. 4.

Typical intensity profiles of Bessel beams are shown in FIG. 3. There is a central spot where the intensity is highest, surrounded by concentric rings with gradually decreasing intensity. In the axial direction, the beam exhibits a line-like shape. Most notably, the beam radius (width of the central peak) is independent of propagation distance within the Bessel zone, in acute contrast to Gaussian beams.

Volumetric imaging using Bessel beams has been exploited in previous inventions. For example, Thériault et al. uses axicon-generated Bessel beams in a multiphoton microscope to collect extended-depth-of-field volumetric images. See U.S. Pat. No. 9,201,008. In a more recent invention, Bessel-beams are generated via a spatial-light modulator (SLM), which mimics the optical phase induced by an axicon. See U.S. Pat. No. 10,809,510.

Method and Apparatus for Beam Shaping and Masking:

Described herein is a method and apparatus that allows fine control over the length of the line focus of Bessel beams, in a very rapid manner, at speeds as fast as 32 kHz or greater. Furthermore, by selection of a sufficiently narrow axial region, one can obtain radial and axial resolution approaching that of conventional Gaussian beam imaging, and in addition allowing depth scans with rate as fast as 32 kHz or greater. Some advantages of the method described herein are that it allows volumetric imaging to work on several times denser samples; it brings about the ability to select planes to be imaged in rapid manner; and it provides means to shift the focal region in z-direction much faster than the x-y axes, significantly reducing the overall image acquisition time.

The method described herein is based on masking selected regions of a laser beam incident on an axicon, or other Bessel-beam-forming optical system. Following the geometry of FIG. 2, one can see that the Bessel zone (the region over which line focus sustains) is determined not only by the cone angle, but also by the input beam size. By masking out annular zones of the input beam, the Bessel zone can be restrained from both directions on the z-axis.

Figure 4:
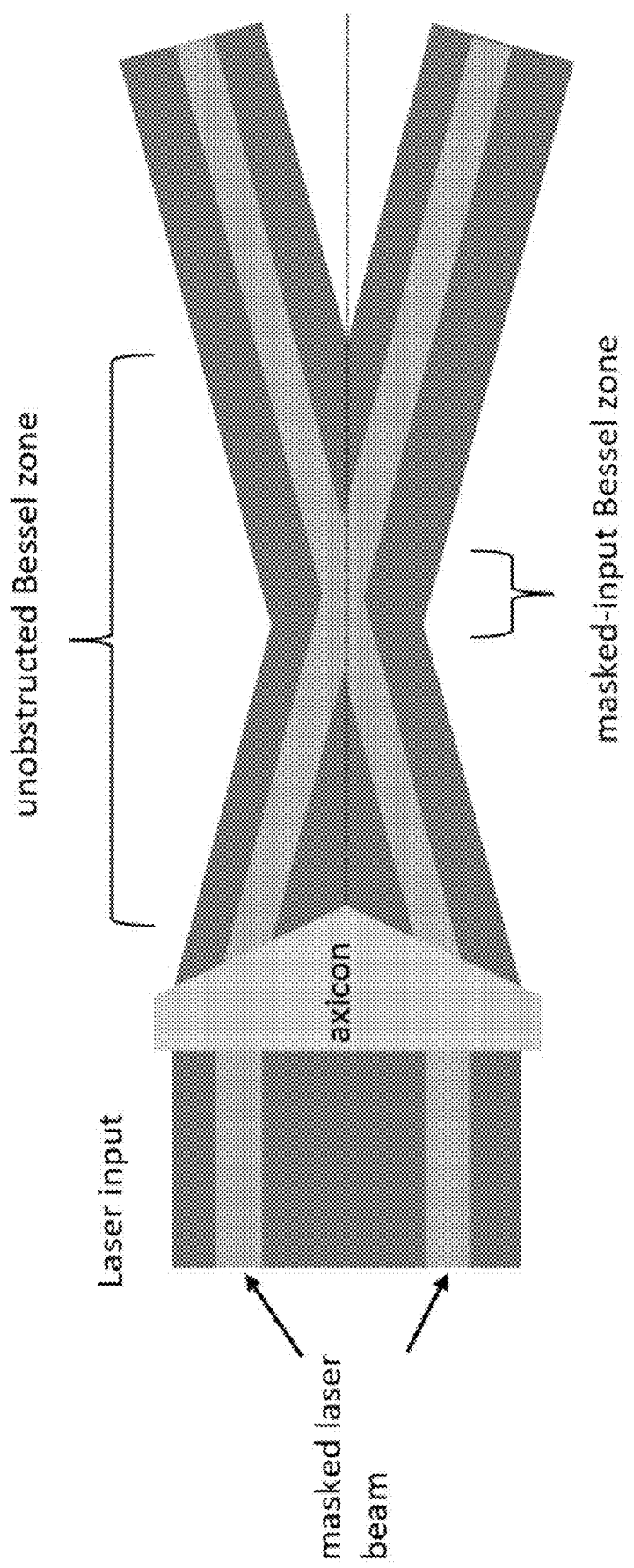
FIG. 4 is a geometrical illustration of controlling the position and length of the line focus of a Bessel beam.

The optical background of the method described herein is illustrated in FIG. 4. The figure shows a typical Gaussian laser beam (dark regions) coming from left and going through the axicon. The region over which the cone of beams overlap is the line focus or the Bessel beam zone. The figure also shows (lighter regions) a masked beam, which in turn generates a shorter overlap region. The length and position of the focal zone is determined by the inner/outer radii of the mask. As a result, by using pertinent input masks, one can generate line foci at controllable depths and with controllable lengths.

Rapid and programmatic control of the Bessel zone shown in FIG. 4 requires a computerized way of generating input masks. A Digital Micromirror Device ("DMD") can be used for this purpose. DMDs are described in U.S. Pat. No. 9,348,136 and thus will not be described in great detail herein. Suffice to say a DMD is an optical-electronic device made of an array of micrometer-size mirrors. Each mirror operates in binary mode (ON and OFF angles). The array is illuminated by a light source, and the reflected light pattern is processed by projecting desired binary patterns to the micro-mirror arrays. Due to the miniature nature of individual elements, DMDs can be operated at 32 kHz pattern rates and beyond.

Figure 5:
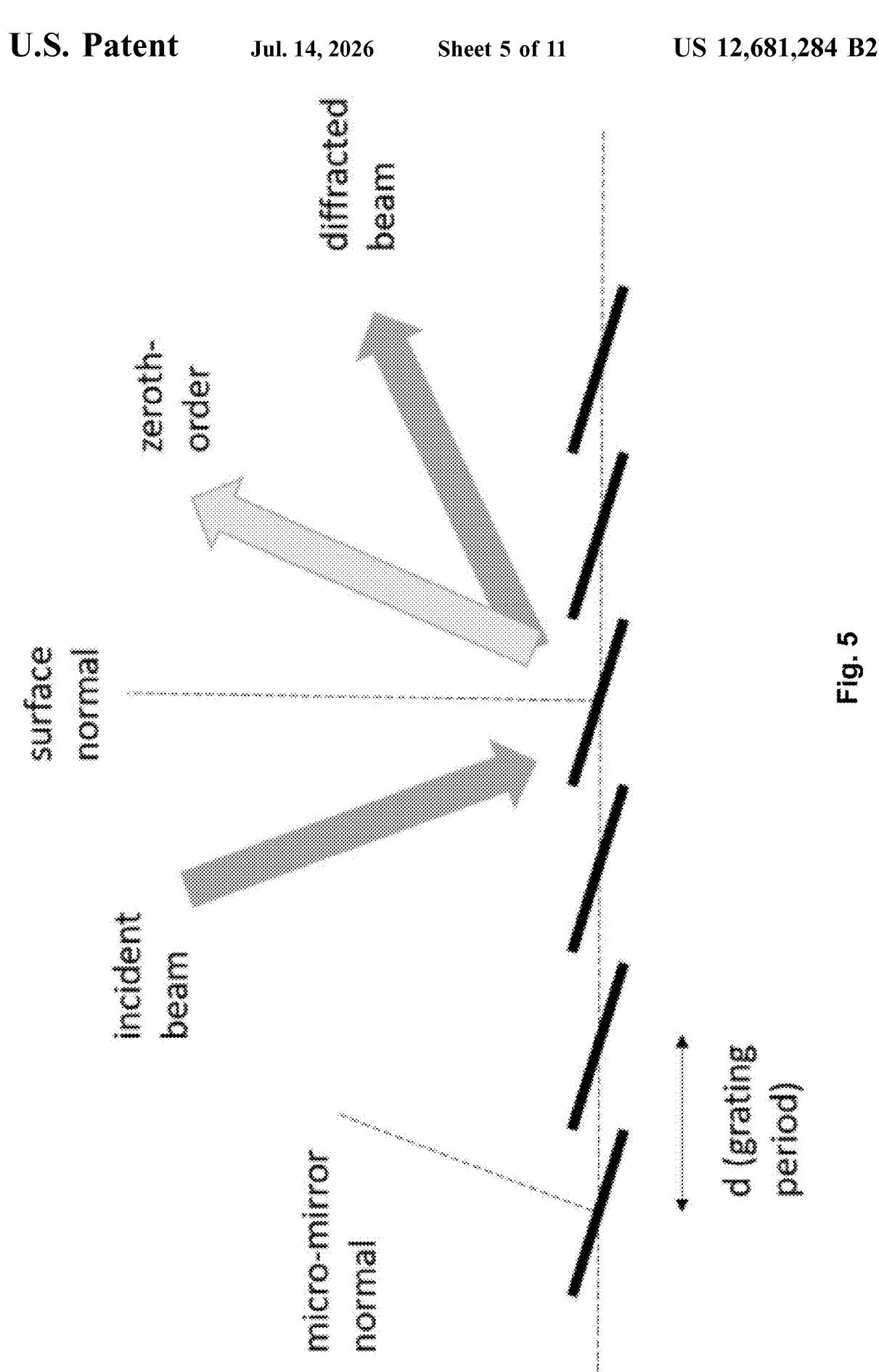
FIG. 5 shows the optical behavior of a DMD as a diffraction grating with angled facets.

For using DMDs in laser or other coherent source applications, particular considerations must be addressed. Due to their periodic pixelated nature, DMDs optically behave as diffraction gratings. When monochromatic light is incident on a diffraction grating with periodic grooves of separation d, part of the light is specularly reflected (angle of incidence being equal to angle of reflection), while part is diffracted in one or more directions. The angle of the diffracted beam is given by grating equation:

$$d(\sin\theta_{in} + \sin\theta_m) = m\lambda \qquad \text{Eq. 5}$$

where $\theta_{in}$ is the angle the input beam makes with the surface normal, $\theta_m$ is the angle of diffracted beam for a particular diffraction order, and m is a positive or negative integer called diffraction order. In general, the presence of numerous diffraction orders reduces the total light power in a particular order. This hurdle is mitigated by using blazed gratings, which consist of sawtooth-like facet profiles (FIG. 5). If the angle of each facet and angle of incidence is arranged such that specular reflection off a facet coincides with a diffraction order, a large proportion of the incident power concentrates in that order. A blazed grating configuration is directly applicable to DMDs (FIG. 5). For highest performance regarding optical throughput, the DMD is configured so that specular reflection off the micro-mirror normal is made coincident with a diffraction order.

Multiphoton imaging systems employ pulsed lasers with typically femtosecond and picosecond (also known as ultrashort) pulse durations. These laser sources require another level of attention when DMDs are to be employed. Ultrashort pulses are inherently broadband, containing a range of wavelengths. According to the grating equation (Eq. 5), diffraction angle is different for each wavelength, and hence, reflection off a DMD causes ultrashort pulses to spread into a fan of angles. This phenomenon is called angular dispersion (S. Akturk et al., "The general theory of first-order spatio-temporal distortions of Gaussian pulses and beams," *Opt Express*, vol. 13, no. 21, pp. 8642-8661, 2005), and is often undesirable since it causes beam ellipticity, increases pulse duration, and consequently decreases fluorescence signal in imaging applications. Angular dispersion can be corrected before or after the DMD in multitude of ways, including using another diffraction grating of appropriate periodicity, a prism of appropriate material and angle, and using combination of gratings, prisms and lenses (J. Cheng et al., "High-speed femtosecond laser beam shaping based on binary holography using a digital micromirror device," *Opt. Lett.*, vol. 40, no. 21, pp. 4875-4878 November 2015).

Figure 6:
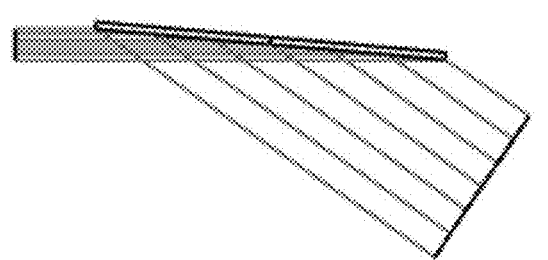
FIG. 6 shows input-output angle configurations for a particular DMD.
Figure 6:
Figure 6:
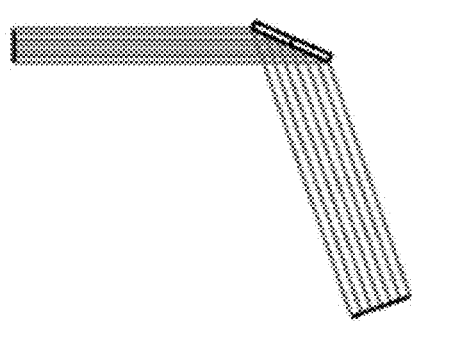
Figure 6:
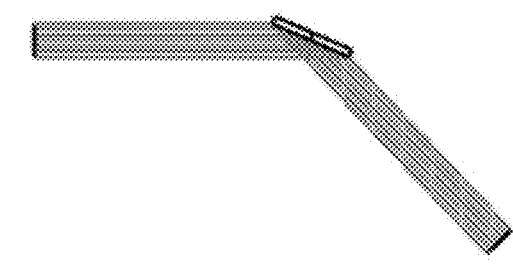
Figure 6:
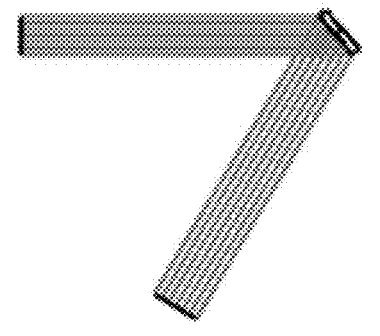
Figure 6:
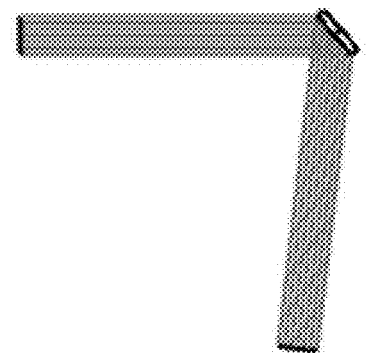

Lastly, diffraction gratings and hence also DMDs introduce beam ellipticity even for a monochromatic laser beam. When the grating equation (Eq. 5) is applied to an extended beam, it can be observed that in the plane of diffraction, the beam extends for incident and diffracted beams can differ, unlike the specular reflection case (zeroth order). If desired, beam ellipticity can be corrected by using elliptical lenses, auxiliary gratings, or prisms. The ellipticity can also be controlled by adjusting the projected micro-mirror ON-OFF pattern on the overall DMD surface (FIG. 6).

DMDs have been used in recent multiphoton imaging applications. Geng et al. used a DMD device to generate binary holograms and to project corresponding laser beams to samples to create a rapidly-adjustable random-access multiphoton imaging apparatus (Q. Geng et al., "Digital micromirror device-based two-photon microscopy for three-dimensional and random-access imaging," *Optica*, vol. 4, no. 6, pp. 674-677, June 2017). Ducros et al. used a spatial light modulator ("SLM") to create a multitude of beam patterns and a DMD to project a desired one of these patterns on the sample to be imaged (M. Ducros et al., "Encoded multisite two-photon microscopy," *Proc. Natl. Acad. Sci.*, vol. 110, no. 32, pp. 13138-13143, August 2013). The DMD allowed rapid alteration between desired input beam conditions and correspondingly rapid jumps to various regions inside the sample under investigation. Park et al. exploited the angular dispersion introduced by DMD to enhance axial resolution in two-photon imaging (J. K. Park et al., "Enhanced Axial Resolution of Wide-Field Two-Photon Excitation Microscopy by Line Scanning Using a Digital Micromirror Device," Micromachines, vol. 8, no. 3, Art. no. 3, March 2017).

Method and Apparatus for Rapid Depth-Scanning in Laser Imaging:

Described herein is a method and apparatus for rapid depth-scanning in laser imaging. The apparatus comprises:
  a laser source in accordance with imaging modalities, operationally linked to laser power and laser beam size control elements;
  an astigmatism-control element dimensioned and configured to pre-compensate for beam ellipticity;
  a diffractive element dimensioned and configured to precompensate for angular dispersion;
  a digital micromirror device (DMD) dimensioned and configured to impart desired mask patterns over the laser beam;
  a relay system that projects the DMD surface to a desired plane;
  a Bessel-beam-forming element, such as an axicon;
  a transfer lens that functions as to relay the Bessel zone to an imaging zone;
  a resonant galvo scanner;
  an optical relay system to relay the resonant galvo plane onto a pair of galvo mirrors;
  a point scanning system comprising a pair of galvo mirrors, a scan lens, a tube lens and an objective lens; and
  a detection system comprising at least one photomultiplier tube.

In certain versions, the apparatus further comprises a centralized control unit, which is configured to adjust the power of the laser source, project desired patterns on the DMD, control galvo scanners, collect fluorescent signals from one or plurality of detectors, collect fluorescent signals from one or plurality of points across a sample, and display collected data as two- or three-dimensional images.

Figure 7:
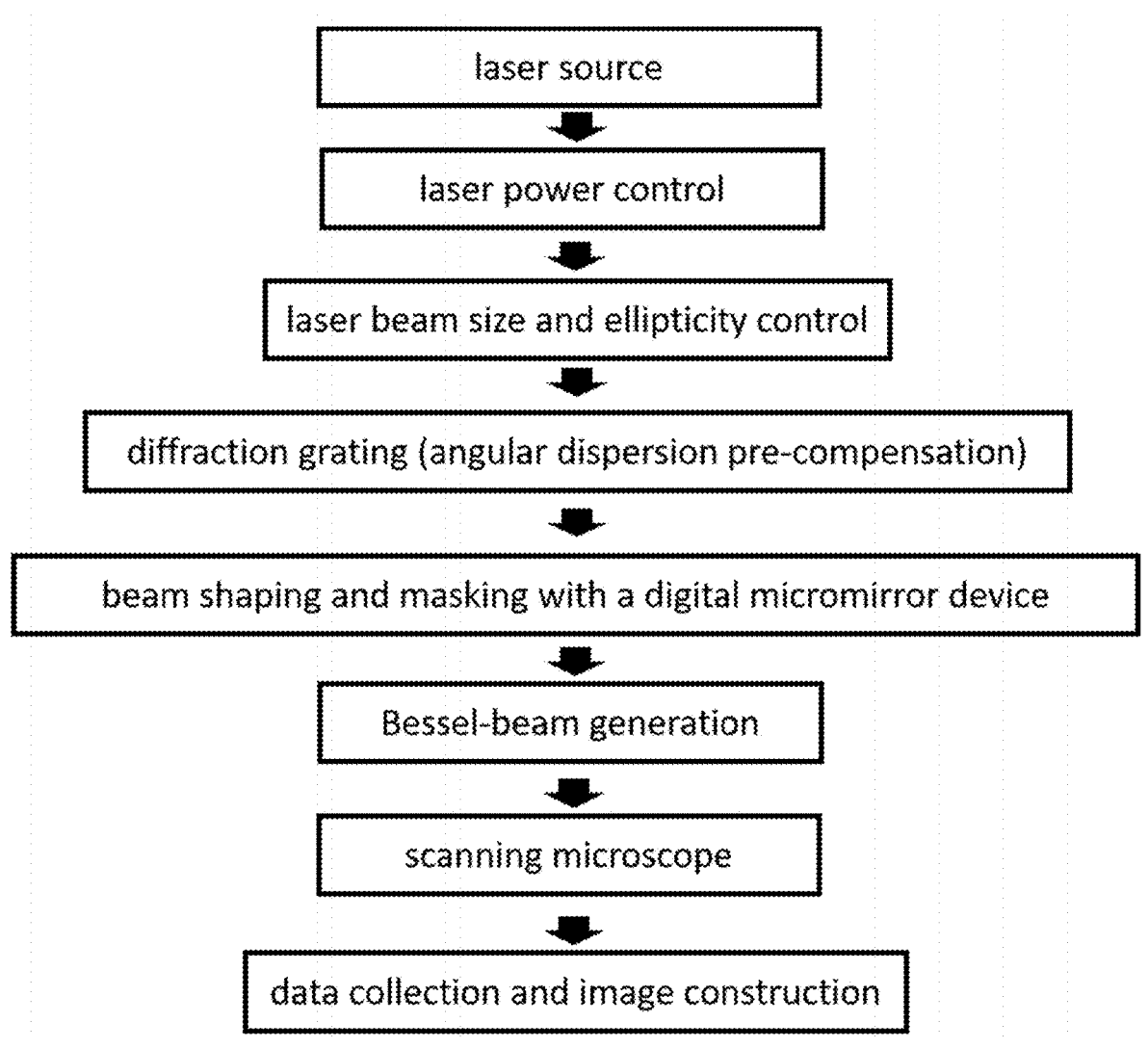
FIG. 7 shows a workflow of the method for rapid depth scan imaging described herein.

A workflow of the method described and claimed herein is illustrated in FIG. 7. A laser source is used as imaging source. The laser power and beam shape are conditioned, followed by beam masking and shaping by a DMD. The masked beam is relayed to the input of Bessel beam-forming element. The resulting beam is then used to image a sample.

That is, a galvanometric scanning microscope performs a point scan on the sample, wherein the image depth of the scan is controlled by the pattern projected onto the DMD. Fluorescence signal from the sample is collected for each scan point, and the image is constructed.

Figure 8:
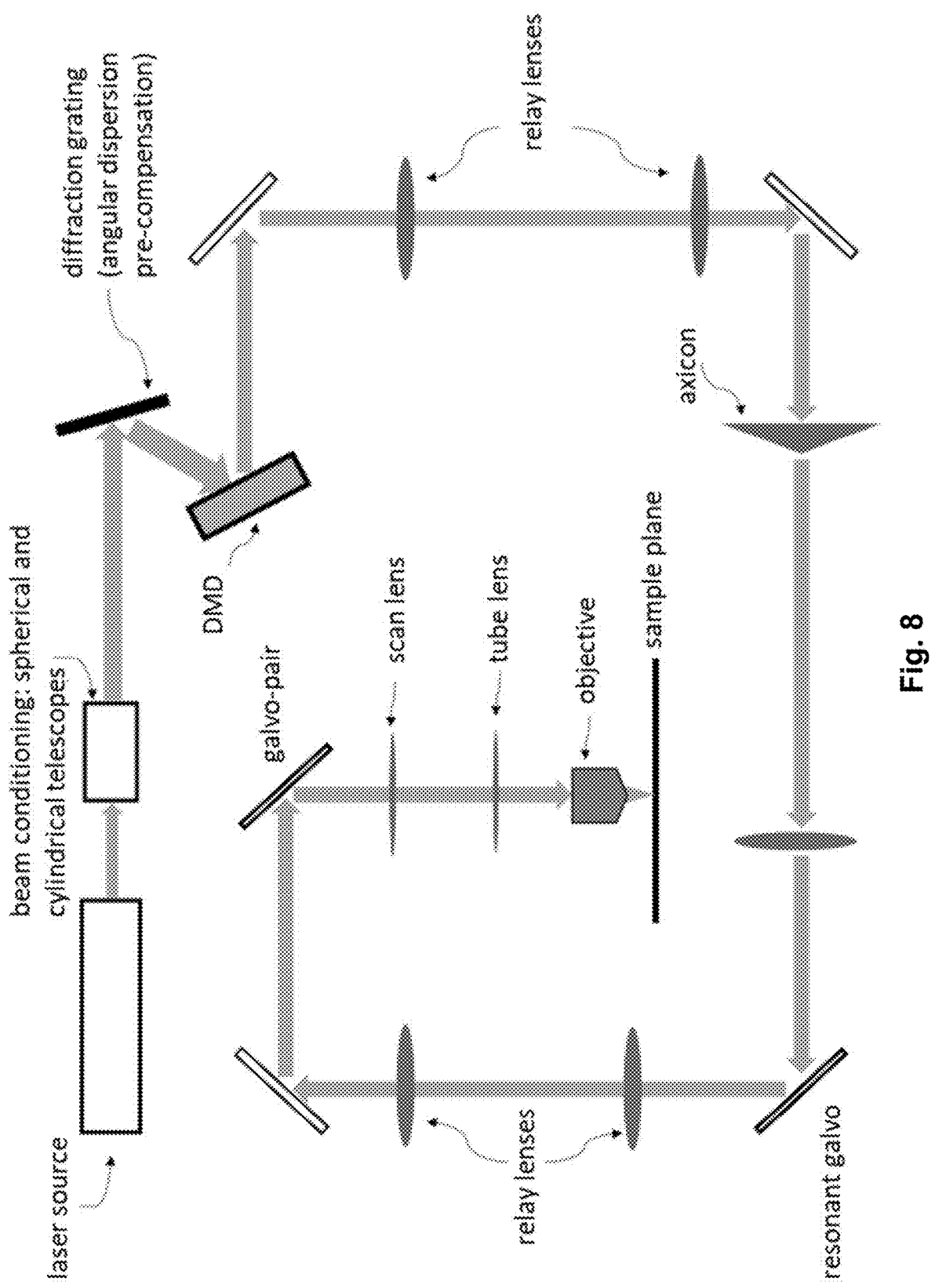
FIG. 8 shows an exemplary layout of the apparatus for rapid depth scan imaging as described herein.

A schematic layout of an exemplary optical imaging system that can be used to practice the method described herein is shown in FIG. 8.

Multiphoton microscopes require a laser light source that can generate intense bursts of short pulse duration. Femtosecond lasers are commonly used for practical applications. The wavelength of the laser can be in the visible, near infrared and infrared regions of the electromagnetic spectrum. 700 nm to 1100 nm wavelengths are commonly used in two-photon, while 1300 nm to 1700 nm wavelengths are commonly used in three-photon fluorescence applications. The results shown below were generated mostly at a wavelength of 920 nm. The power of the laser output can be controlled via polarization-state (e.g., Pockels' cells and the like).

In preferred embodiments, the laser output beam is conditioned using pairs of spherical and cylindrical lenses. Spherical lenses make up a circularly symmetric beam expander/compressor, to fill-up a desired portion of the DMD. The cylindrical lenses make up an elliptical beam expander/compressor to compensate for the ellipticity resulting from the downstream diffractive elements to follow. The placement of these beam-conditioning elements can be before or after the DMD. Astigmatism compensation is not mandatory for the method and apparatus described herein. It is, however, desired. The ellipticity can also be corrected via the patterns projected on the DMD. Correction before the DMD enhances power throughput.

A diffraction grating may be used to pre-compensate angular dispersion imposed by the DMD. The diffraction grating used for angular-dispersion correction can be a reflective or transmissive one. The groove density of the diffraction grating can be designed such that angular dispersion of the masking device and diffraction grating are equal in magnitude but opposite in sign. In one example, a diffraction grating with 600 mm$^{-1}$ groove density is used. This spacing substantially negates the angular dispersion of the DMD. The diffraction grating is kept in close physical proximity to the DMD to avoid substantial separation of colors (also known as spatial dispersion) due to the angular spread of wavelengths. Alternatively, one can use a diffraction grating followed by a pair of lenses to obtain extended separation between the diffraction grating and DMD, as well as obtaining no spatial dispersion. As another alternative, one can use combination of prisms and gratings of determined parameters to substantially or totally negate angular and spatial dispersion after DMD. In another example, a customized transmissive volume-phase-holographic diffraction grating with desired grove density is used to substantially negate the angular dispersion of the DMD, for high transmission efficiency.

The DMD used in one exemplary construction of the apparatus has the following parameters:

micromirror array size: 1280×800 micromirror pitch: 10.8 micrometers micromirror tilt angle: 12 degrees

DMD maximum pattern rate: 12 kHz

DMD reflectance rating: 800 nm-2000 nm

DMD orientation: square, lands on corner

To maximize diffraction efficiency off the DMD, an optical configuration using a blazed grating is used, as illustrated in FIG. 5. For the DMD with parameters given above, an input angle of 41.64 degrees and a diffraction angle of 17.64 degrees at m=3 diffraction order simultaneously satisfies the grating equation and blaze condition, and thus yields the highest optical power throughput.

Figure 9:
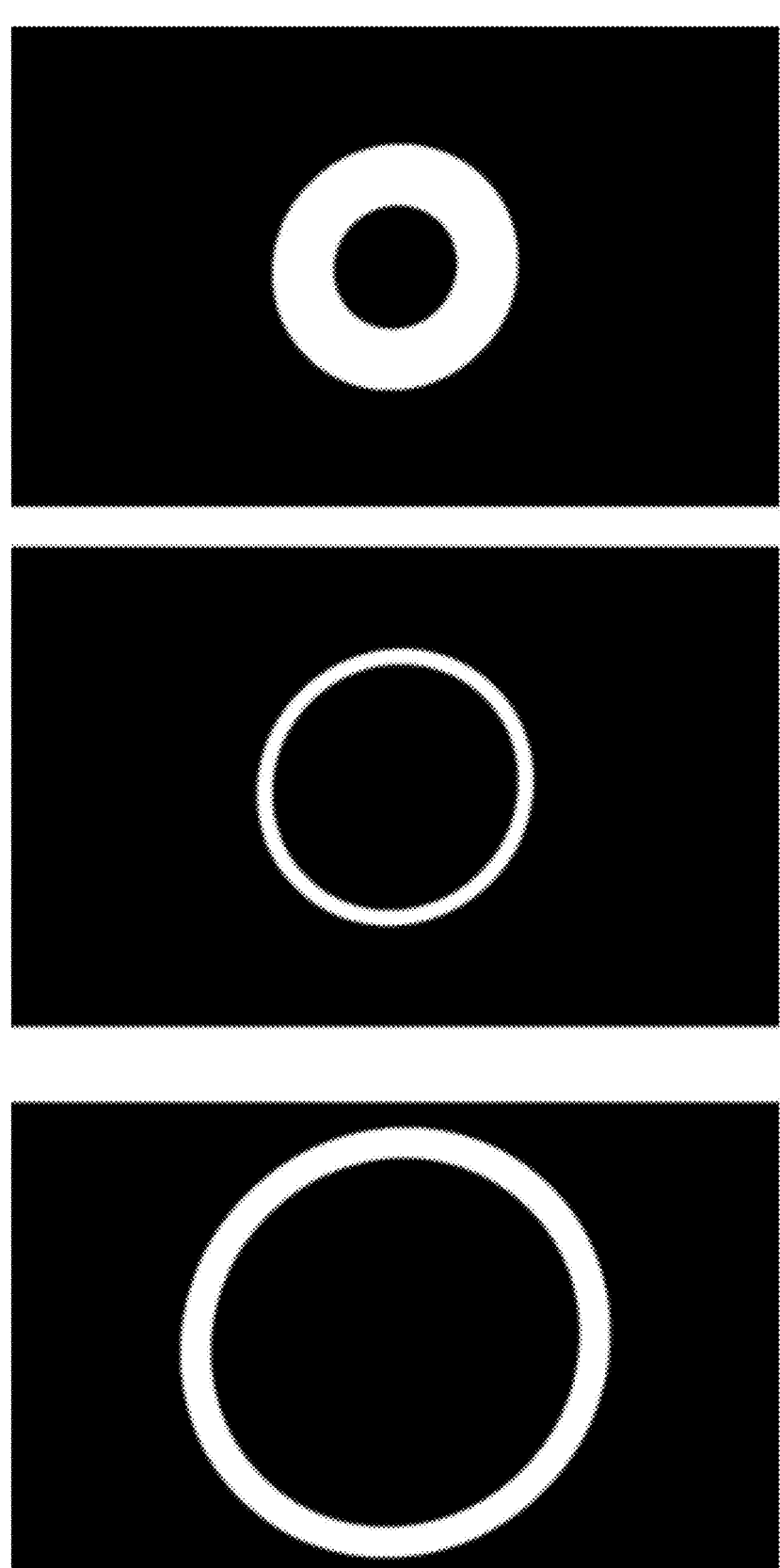
FIG. 9 shows examples of ring-type patterns calculated and projected onto the DMD.

The DMD is controlled by Field-Programmable Gate Array (FPGA)—based high-speed electronics. Desired patterns are pre-calculated and loaded onto the controller through a personal computer. The patterns are images consisting of black-and-white regions, which the DMD controller interprets as OFF and ON states for corresponding pixels (e.g., micromirrors). FIG. 9 shows some examples of ring-type patterns calculated and used in practical uses of the apparatus. The DMD can be used to generate a mask with multiple simultaneous rings, such that each ring generates a different focal zone in the sample plane, allowing simultaneous imaging from a plurality of planes. Alternatively, The DMD can switch between two ring shapes, such that teach ring generates a different focal zone in the sample plane, allowing interlaced imaging between the two planes.

After the laser beam is appropriately masked by the DMD, the ongoing beam is converted to Bessel beams. The DMD can be in close proximity to the Bessel-beam-forming element, in order to minimize diffractive spread due to the imposed mask. Alternatively, an optical relay can create the image of the DMD surface at the entrance facet of the Bessel-beam-forming element. In one configuration, a 4f-relay system is used, where two identical lenses of each with focal distance f is used, the first lens is a distance f away from DMD, lens separation is 2f and beam propagates another distance f until the relay plane.

Bessel beam-forming elements can be chosen among different alternatives. One method is to use a conical lens (also known as axicon). In one configuration, a conical lens of base angle 2 degrees is employed. One can also use a spatial light modulator, which is a pixelated element that can generate desired optical phase patterns via computer control. Another alternative is using a periodic diffraction grating of circular symmetry, or diffractive axicons. In all these configurations, the dimensions of the ring-like profile projected on the DMD will determine the depth of the Bessel zone formed after the element. In another alternative configuration, the ring is made sufficiently narrow as to induce large beam spread due to diffraction, the relay plane of the ring is followed by a conventional lens, and a Bessel beam is formed at and around the focal plane of the lens (J. Durnin et al., "Diffraction-free beams," *Phys Rev Lett*, vol. 58, no. 15, pp. 1499-1501, 1987).

The Bessel beams formed via any one of the multitudes of the methods mentioned above needs to be transferred to the focal plane of the microscope objective lens used for imaging purposes. A transfer lens placed after the Bessel zone ensures proper mapping. The rest of the optical configuration comprises a single-axis resonant galvo, optical relay, a dual-axis conventional galvo, followed by scan lens/tube lens and lastly the objective lens.

Figure 10:
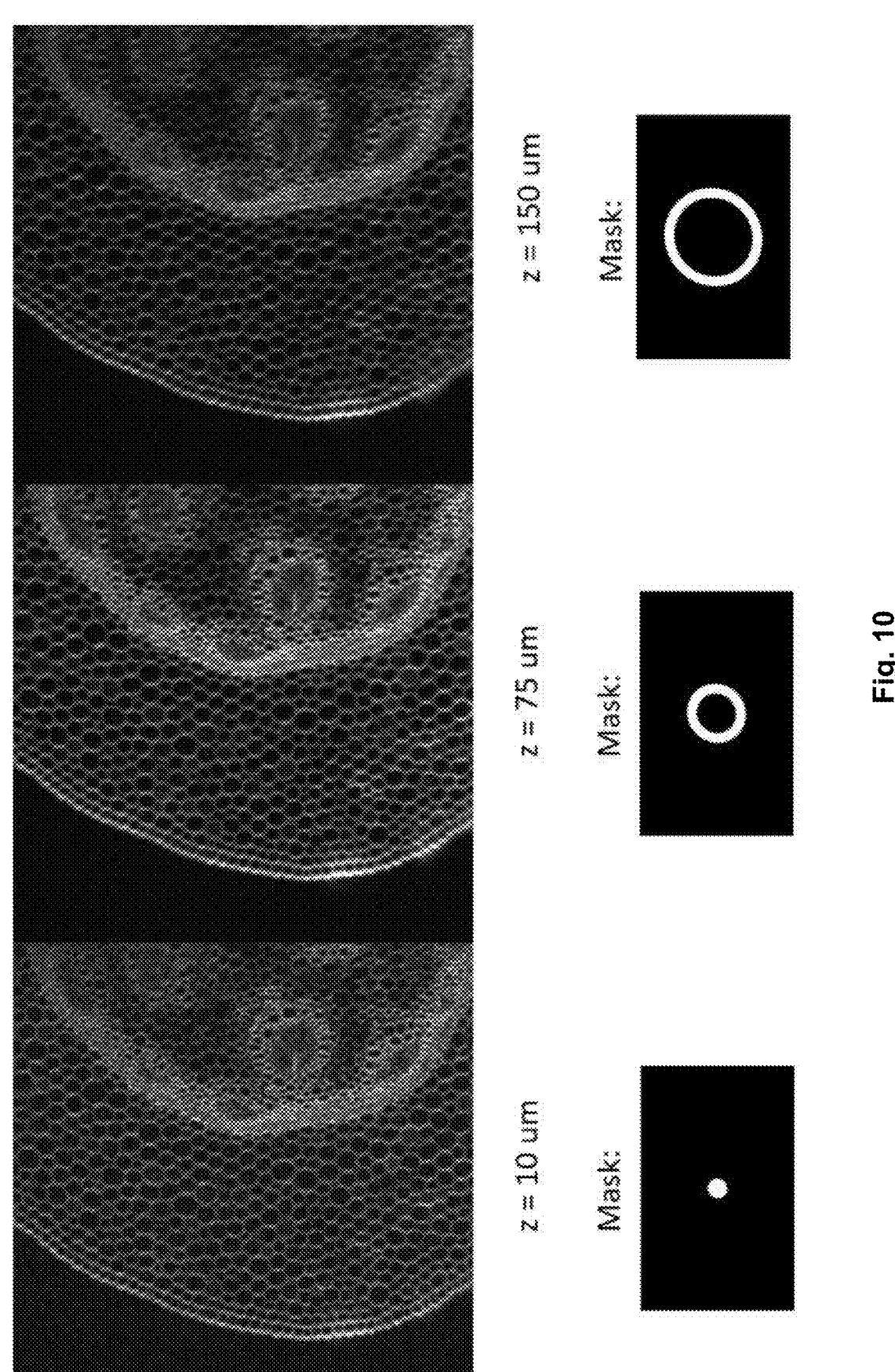
FIG. 10 shows two-photon images of a *convallaria* sample obtained via DMD-shaped Bessel beams. DMD masks and corresponding image planes are shown below the images.
Figure 11:
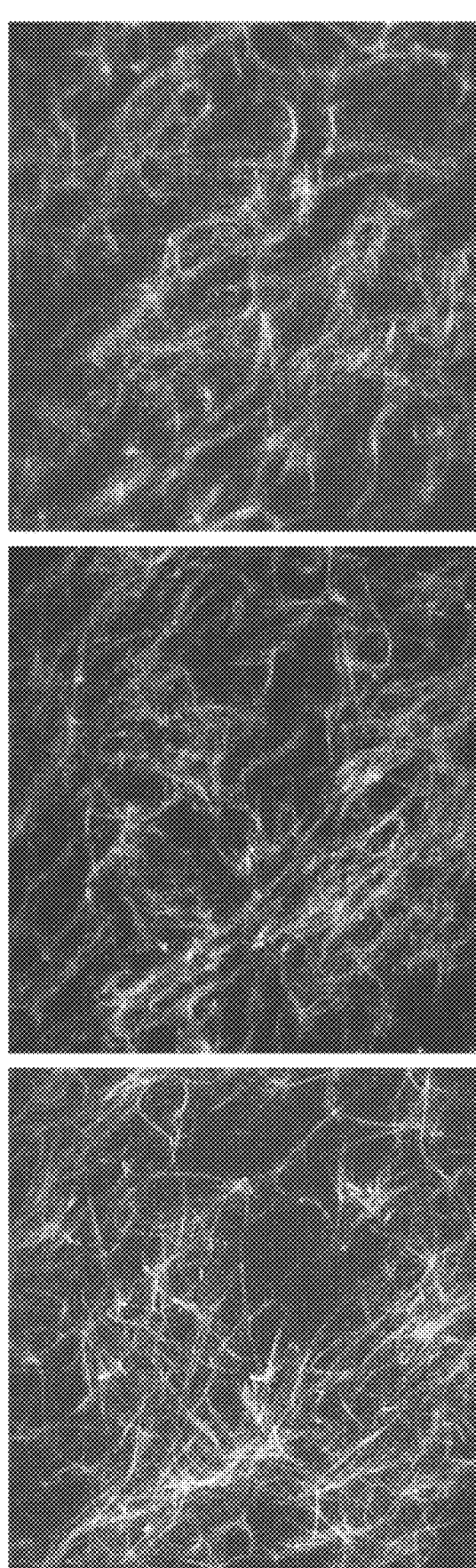
FIG. 11 shows two-photon series of images from varying depths of a fluorescent-stained collagen sample, where the depth variation is obtained via DMD-shaped Bessel beams.

FIG. 10 shows a two-photon imaging of a *convallaria* sample and FIG. 11 shows a two-photon imaging of a collagen sample, both obtained using the apparatus disclosed herein. By varying the dimensions of the ring-like mask projected on the DMD, the width of the Bessel zone, and thus the imaging depth, can be controlled and adjusted as desired.

Multi-photon imaging systems are often furnished with a secondary laser source used for manipulating cells with light, a method known as photostimulation. The method and apparatus disclosed herein can also be used for photostimulation.

In conclusion, the method and apparatus disclosed herein encompasses optical combinations of a DMD with a Bessel-beam-forming system to enable rapid (multi kHz rate) modification of the input mask, thereby rapidly varying the length and axial location of a subsection of a Bessel beam region in a sample. This method and apparatus enable significant improvement and flexibility over the conventional, state-of-the-art imaging modalities.

What is claimed is:

1. An apparatus for rapid depth-scanning in laser imaging or photostimulation, comprising:
  a laser source dimensioned and configured to generate an input laser beam;
  a masking device dimensioned and configured to mask desired patterns over the input laser beam to yield a masked laser beam;
  a beam-shaping element to convert the masked laser beam to a beam with controlled position and length of line focus;
  a scanning microscope dimensioned and configured to transfer the beam resulted from the beam-shaping element to a focal plane of a microscope objective lens.

2. The apparatus of claim 1, further comprising a laser beam power controller and a laser beam size controller operationally linked to the laser source.

3. The apparatus of claim 1, further comprising an astigmatism controller dimensioned, configured, and located to correct for beam ellipticity of the input laser beam.

4. The apparatus of claim 1, further comprising a diffractive element dimensioned and configured to correct for angular dispersion, which is placed before or after the masking device.

5. The apparatus of claim 1, wherein the masking device generates a mask with multiple simultaneous rings, such that each ring generates a different focal zone in a sample plane, allowing simultaneous imaging from a plurality of planes.

6. The apparatus of claim 1, wherein the masking device switches between two ring shapes, such that each ring generates a different focal zone in a sample plane, allowing interlaced imaging between the two planes.

7. The apparatus of claim 1, wherein the masking device is a digital micromirror device ("DMD").

8. The apparatus of claim 7, wherein the DMD uses a blazed grating to maximize diffraction efficiency of the DMD.

9. The apparatus of claim 1, wherein the beam resulted from the beam-shaping element is a Bessel beam.

10. The apparatus of claim 1, wherein the beam-shaping element is an axicon.

11. The apparatus of claim 1, wherein the beam-shaping element is a spatial light modulator.

12. The apparatus of claim 1, wherein the beam-shaping element is a diffractive axicon.

13. The apparatus of claim 1, further comprising an optical relay system dimensioned and configured to project an image of the masked laser beam at an entrance facet of the beam-shaping element.

14. The apparatus of claim 1, wherein the scanning microscope further comprises:
  a transfer lens to relay the beam resulted from the beam-shaping element to an imaging zone;
  a resonant galvo scanner;
  an optical relay system to relay the resonant galvo plane onto a pair of galvo mirrors; and
  a point scanning system comprising a pair of galvo mirrors, a scan lens, a tube lens, and an objective lens.

15. The apparatus of claim 1, further comprising a detection system comprising at least one photomultiplier tube.

16. The apparatus of claim 1, further comprising a centralized control unit dimensioned and configured to control power of the laser source, project the desired patterns on the masking device, control galvo scanners, collect fluorescent signals from at least one detector, collect fluorescent signals from at least one point in a sample, and display collected data as two- or three-dimensional images.

17. A method for rapid depth-scanning in laser imaging or photostimulation, comprising:
  (a) generating an input laser beam;
  (b) masking a desired pattern over the input laser beam to yield a masked laser beam;
  (c) converting the masked laser beam to a beam with controlled position and length of line focus;
  (d) transferring the beam of step (c) to a focal plane of a microscope objective lens; and
  (e) collecting fluorescence signal from a sample illuminated with the beam of step (d).

18. The method of claim 17, further comprising adjusting laser power and/or laser beam size of the input laser beam after step (a).

19. The method of claim 17, further comprising correcting for beam ellipticity before or after step (b).

20. The method of claim 17, further comprising correcting for angular dispersion before or after step (b).

21. The method of claim 17, further comprising projecting an image of the masked laser beam generated in step (b) for converting the masked laser beam in step (c).

22. The method of claim 17, wherein the beam generated from step (c) is a Bessel beam.

* * * * *